(12) United States Patent
Umeno et al.

(10) Patent No.: US 12,503,081 B2
(45) Date of Patent: Dec. 23, 2025

(54) VEHICLE WINDSHIELD WIPER

(71) Applicant: DENSO CORPORATION, Kariya (JP)

(72) Inventors: Takashi Umeno, Kariya (JP); Takashi Matsui, Iwakura (JP)

(73) Assignee: DENSO CORPORATION, Kariya (JP)

( * ) Notice: Subject to any disclaimer, the term of this patent is extended or adjusted under 35 U.S.C. 154(b) by 252 days.

(21) Appl. No.: 17/990,398

(22) Filed: Nov. 18, 2022

(65) Prior Publication Data
US 2023/0159002 A1 May 25, 2023

(30) Foreign Application Priority Data
Nov. 24, 2021 (JP) .................................. 2021-190466

(51) Int. Cl.
*B60S 1/52* (2006.01)
*B05B 1/14* (2006.01)
*B05B 15/62* (2018.01)

(52) U.S. Cl.
CPC ................. *B60S 1/522* (2013.01); *B05B 1/14* (2013.01); *B05B 15/62* (2018.02)

(58) Field of Classification Search
CPC ........ B60S 1/522; B60S 1/524; B60S 1/3415; B60S 1/3862
USPC .............................. 15/250.04, 250.01, 250.02
See application file for complete search history.

(56) References Cited

U.S. PATENT DOCUMENTS 3,428,992 A * 2/1969 Di Giorgio ............. B60S 1/522
  15/250.04
3,448,482 A * 6/1969 Close ........................ B60S 1/48
  15/250.04
3,790,083 A * 2/1974 Redifer ...................... B05B 1/10
  15/250.04
3,913,167 A * 10/1975 Frigon .................... B60S 1/522
  15/250.04
3,940,068 A * 2/1976 Mohnach ................ B05B 15/60
  15/250.04

(Continued)

FOREIGN PATENT DOCUMENTS

JP  2004-081900 A  3/2004
JP  2006-335323 A  12/2006

(Continued)

OTHER PUBLICATIONS

Machine translation of description portion of WO publication 2016/050925, published Apr. 2016. (Year: 2016).*

*Primary Examiner* — David S Posigian
(74) *Attorney, Agent, or Firm* — Oliff PLC (57) ABSTRACT

A vehicle windshield wiper includes a wiper blade that wipes a wiped surface, and a wiper arm, connected to the wiper blade, that transmits driving force for a wiping operation to the wiper blade. A washer nozzle, supplying a washer fluid to the wiped surface by spraying, is integrally provided in the wiper arm or the wiper blade. When an end portion in a longitudinal direction on a side that coincides with a tip end portion of the vehicle windshield wiper is a tip end portion of the wiper blade and an end portion on an opposite side is a rear end portion of the wiper blade, the washer nozzle includes a film-like spraying portion that emits a spray of the washer fluid oriented downward at an angle towards at least the tip end side of the wiper blade, the spray having a film-like spread in the longitudinal direction.

10 Claims, 8 Drawing Sheets

(56) References Cited

U.S. PATENT DOCUMENTS

| | | | | |
|---|---|---|---|---|
| 4,516,288 | A | * | 5/1985 | Fizyta ............... B60S 1/522 |
| | | | | 15/250.04 |
| 6,393,652 | B1 | * | 5/2002 | Vogt .................. B60S 1/522 |
| | | | | 15/250.04 |
| 6,520,424 | B1 | * | 2/2003 | Lesser ............... B60S 1/524 |
| | | | | 239/284.1 |
| 6,604,692 | B2 | * | 8/2003 | Utz .................... B60S 1/522 |
| | | | | 239/284.1 |
| 7,429,004 | B2 | * | 9/2008 | Kondou ............. B05B 1/28 |
| | | | | 239/592 |
| 9,630,591 | B2 | * | 4/2017 | Grasso .............. B60S 1/4048 |
| 2008/0155776 | A1 | | 7/2008 | Harita |

FOREIGN PATENT DOCUMENTS

| | | | |
|---|---|---|---|
| JP | 2006-347398 A | 12/2006 | |
| JP | 6755016 B2 | 9/2020 | |
| WO | WO-2016050925 A1 * | 4/2016 | ............ B60S 1/3429 |

\* cited by examiner

VEHICLE WINDSHIELD WIPER

CROSS-REFERENCE TO RELATED APPLICATIONS

This application is based on and claims the benefit of priority from Japanese Patent Application No. 2021-190466, filed on Nov. 24, 2021. The entire disclosure of the above application is incorporated herein by reference.

BACKGROUND

Technical Field

The present disclosure relates to a vehicle windshield wiper that includes a washer nozzle.

Related Art

A vehicle windshield wiper that includes a washer nozzle is known. For example, the washer nozzle is mounted in a tip end portion of a wiper arm provided in the vehicle windshield wiper. A washer fluid is supplied by being sprayed onto a wiped surface at each location in a longitudinal direction of a wiper blade provided in the vehicle windshield wiper, from a center portion in the longitudinal direction of the wiper blade.

SUMMARY

One aspect of the present disclosure provides a vehicle windshield wiper that includes a wiper blade, a wiper arm, and a washer nozzle. The wiper blade wipes a wiped surface. The wiper arm is connected to the wiper blade and transmits driving force for a wiping operation to the wiper blade. The washer nozzle supplies a washer fluid to the wiped surface by spraying and is integrally provided in the wiper arm or the wiper blade. When an end portion in a longitudinal direction of the vehicle windshield wiper on a side that coincides with a tip end portion of the vehicle windshield wiper is a tip end portion of the wiper blade and an end portion on an opposite side is a rear end portion of the wiper blade, the washer nozzle includes a spraying portion that emits a spray of the washer fluid that is oriented downward at an angle towards at least the tip end side of the wiper blade, the spray having a film-like spread in the longitudinal direction of the wiper blade.

DESCRIPTION OF THE EMBODIMENTS

As a vehicle windshield wiper that includes a washer nozzle, a technology that is disclosed in Japanese Patent Publication No. 6755016 and the like are known. For example, the washer nozzle is mounted in a tip end portion of a wiper arm. A washer fluid is supplied by being sprayed onto a wiped surface at each location in a longitudinal direction of a wiper blade, from a center portion in the longitudinal direction of the wiper blade.

The washer fluid that is supplied by being sprayed onto the wiped surface from the washer nozzle is preferably supplied without waste within a longitudinal direction range of the wiper blade, if subsequent wiping by the wiper blade is taken into consideration. Whether the supply of the washer fluid in this manner is appropriately performed not only when the vehicle is stopped, but also when the vehicle is traveling is an issue to be examined.

That is, vehicle travel wind that is wind that moves from a front side of a vehicle towards a rear side while the vehicle is traveling acts on the vehicle windshield wiper. During a process of a wiping operation by the vehicle windshield wiper, when the longitudinal direction of the wiper blade runs along a longitudinal direction of the vehicle, the vehicle travel wind also runs along the longitudinal direction of the wiper blade. In such a state, when the washer fluid is sprayed in a spray that has linear directionality so that the washer fluid is supplied so as to reach a tip end portion of the wiper blade, propulsion force of the washer fluid is strong in the spray that has linear directionality, and the washer fluid lands in a localized manner.

In addition, because an angle of incidence of the washer fluid relative to the wiped surface is small, the washer fluid after landing on the wiped surface greatly spreads toward a tip end side in a spray direction due to the propulsion force. The washer fluid tends to be supplied beyond the tip end portion of the wiper blade. Furthermore, the spreading of the washer fluid is further facilitated due to effects of the travel wind, as well, during high-speed travel, and an area in which the washer fluid is supplied is unstable. The washer fluid is supplied beyond the longitudinal direction range of the wiper blade and is wasted. Moreover, if the spray is oriented towards an inner side in the longitudinal direction of the wiper blade to suppress runoff of the washer fluid beyond the tip end portion of the wiper blade, the washer fluid cannot be sufficiently supplied to the tip end portion during low-speed travel.

It is thus desired to provide a vehicle windshield wiper that includes a washer nozzle that is capable of favorably supplying a sprayed washer fluid within a longitudinal direction range of a wiper blade, even in a state of being affected by vehicle travel wind.

One exemplary embodiment of the present disclosure provides a vehicle windshield wiper that includes: a wiper blade that wipes a wiped surface; a wiper arm that is connected to the wiper blade and transmits driving force for a wiping operation to the wiper blade; and a washer nozzle that supplies a washer fluid to the wiped surface by spraying and is integrally provided in the wiper arm or the wiper blade. When an end portion in a longitudinal direction of the vehicle windshield wiper on a side that coincides with a tip end portion of the vehicle windshield wiper is a tip end portion of the wiper blade and an end portion on an opposite side is a rear end portion of the wiper blade, the washer nozzle includes a film-like spraying portion that emits a spray of the washer fluid that is oriented downward at an angle towards at least the tip end side of the wiper blade, the spray having a film-like spread in the longitudinal direction of the wiper blade. Here, the film-like spraying portion does not refer to a spraying portion that is formed into a film-like shape, but refers to a spraying portion that emits a spray having a film-like spread.

According to the above-described configuration, the washer nozzle that is included in the vehicle windshield wiper emits, from the film-like spraying portion, a spray that has a film-like spread in the longitudinal direction of the wiper blade, in the spray of the washer fluid that is oriented downward at an angle towards the tip end side of the wiper blade. The washer fluid that is sprayed in a film-like manner from the film-like spraying portion can be made to continuously land on the wiped surface within a longitudinal direction range of the wiper blade. For example, compared to intermittent landing such as that when sprays that have linear directionality are emitted at multiple points, the washer fluid that is substantially uniformly continuous in the longitudinal direction can be supplied.

In addition, the washer fluid that is sprayed so as to spread in a film-like manner has a weaker propulsion force compared to a spray that has linear directionality. Therefore, the washer fluid after landing on the wiped surface also has a smaller spread in a spray direction resulting from the propulsion force. Therefore, even when the tip end side of the film-like spray is sprayed near the tip end portion of the wiper blade, the washer fluid is suppressed from spreading due to the propulsion force after landing. That is, the sprayed washer fluid can be favorably supplied to the wiped surface within the longitudinal direction range of the wiper blade, without waste.

A vehicle windshield wiper according to an embodiment will hereinafter be described.

[Overall Configuration of a Vehicle Windshield Wiper 10]

Figure 1:
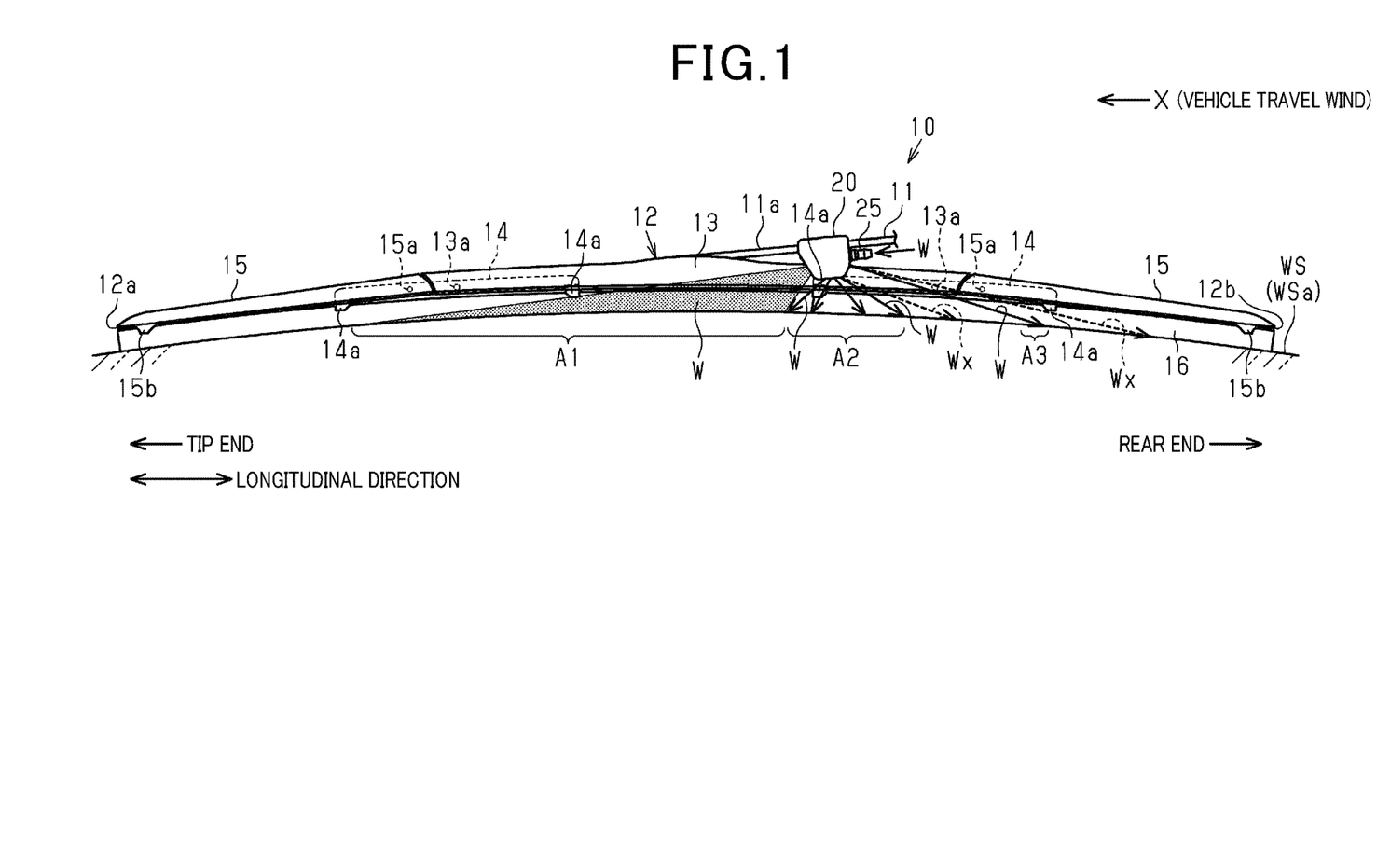
FIG. 1 is a configuration diagram illustrating a vehicle windshield wiper that includes a washer nozzle according to an embodiment.

A vehicle windshield wiper 10 according to the present embodiment shown in FIG. 1 wipes an outer surface of a windshield WS on a front side of a vehicle. The outer surface of the windshield WS serves as a wiped surface WSa. The vehicle windshield wiper 10 includes a wiper arm 11 and a wiper blade 12. The vehicle windshield wiper 10 is configured such that a tip end portion of the wiper arm 11 and a center portion in a longitudinal direction of the wiper blade 12 are connected. The vehicle windshield wiper 10 reciprocally swings the wiper arm 11 by being driven by a wiper motor (not shown). The wiper blade 12 that receives driving force from the wiper arm 11 reciprocally swings in a direction that is orthogonal to the longitudinal direction thereof. The wiper blade 12 wipes the wiped surface WSa in a circular arc shape and wipes away foreign matter, such as raindrops, that are attached to the wiped surface WSa. In addition, the vehicle windshield wiper 10 according to the present embodiment integrally includes a washer nozzle 20 that supplies a washer fluid W to the wiped surface WSa by spraying.

[Configurations of the Wiper Arm 11 and the Wiper Blade 12]

As an example of various configurations, the wiper blade 12 includes a main lever 13, two yoke levers 14, two movable covers 15, and a blade rubber 16. These components each have a shape that is elongated in one direction and are arranged such that respective longitudinal directions coincide with one another.

Respective center portions of the yoke levers 14 are rotatably connected by shaft portions 13a to both end portions in the longitudinal direction of the main lever 13. In a portion of each yoke lever 14 that slightly protrudes outward from the main lever 13 in the longitudinal direction, a base end portion of the movable cover 15 is rotatably connected by a shaft portion 15a. The movable covers 15 and the main lever 13 that are connected to the yoke levers 14 have an integrated outer shape that is continuous in the longitudinal direction. The movable covers 15 and the main lever 13 are configured such that a length in the longitudinal direction is equal to a length in the longitudinal direction of the blade rubber 16 that is long.

Gripping portions 14a for gripping the blade rubber 16 are provided in both end portions in the longitudinal direction of each yoke lever 14. In addition, a gripping portion 15b for gripping the blade rubber 16 is provided in a tip end portion of each movable cover 15. The total of six gripping portions 14a and 15b that are provided in the yoke levers 14 and the movable covers 15 are positioned at predetermined intervals in the longitudinal direction of the blade rubber 16, and grip the blade rubber 16 at respective locations in the longitudinal direction. Furthermore, in at least one location of the gripping portions 14a and 15b, the blade rubber 16 is locked so as to be immovable in the longitudinal direction.

The wiper blade 12 such as this is rotatably connected to the tip end portion of the wiper arm 11 in a center portion in the longitudinal direction of the main lever 13. The tip end portion of the wiper arm 11 has a hook portion (not shown) in which an arm material that is fabricated into a long, narrow plate shape is bent into a U shape. The tip end portion of the wiper arm 11 is connected to the main lever 13 of the wiper blade 12 in the hook portion with a connecting member (such as a clip that is not shown) therebetween. A portion of the tip end portion of the wiper arm 11 following the hook portion is a tip-end plate portion 11a that is formed into a plate shape of a predetermined length. The tip-end plate portion 11a is a portion in which the washer nozzle 20 is mounted. The washer nozzle 20 that is mounted in the tip end portion (a portion that is close to the hook portion and further towards a rear end side than the hook portion is) of the washer arm 11 supplies the washer fluid W by spraying towards the wiped surface WSa, from near an upper portion of the center portion in the longitudinal direction of the wiper blade 12.

Here, for use in descriptions below and the like regarding the washer nozzle 20, an end portion in the longitudinal direction on a side that coincides with the tip end portion of the vehicle windshield wiper 10 is referred to as a tip end portion 12a of the wiper blade 12. An end portion on a side opposite the tip end portion 12a is referred to as a rear end portion 12a of the wiper blade 12. In addition, in a state in which the washer nozzle 20 is mounted in the wiper arm 11, a vertical direction (up/down direction) of the washer nozzle 20 is a direction receding from/approaching the wiped surface WSa to be wiped by the wiper blade 12. A lateral direction (left/right direction) of the washer nozzle 20 is the longitudinal direction of the wiper blade 12. A longitudinal direction (depth direction) of the washer nozzle 20 is a transverse direction (lateral direction) that is orthogonal to the longitudinal direction of the wiper blade 12.

[Configuration of the Washer Nozzle 20]

Figure 2:
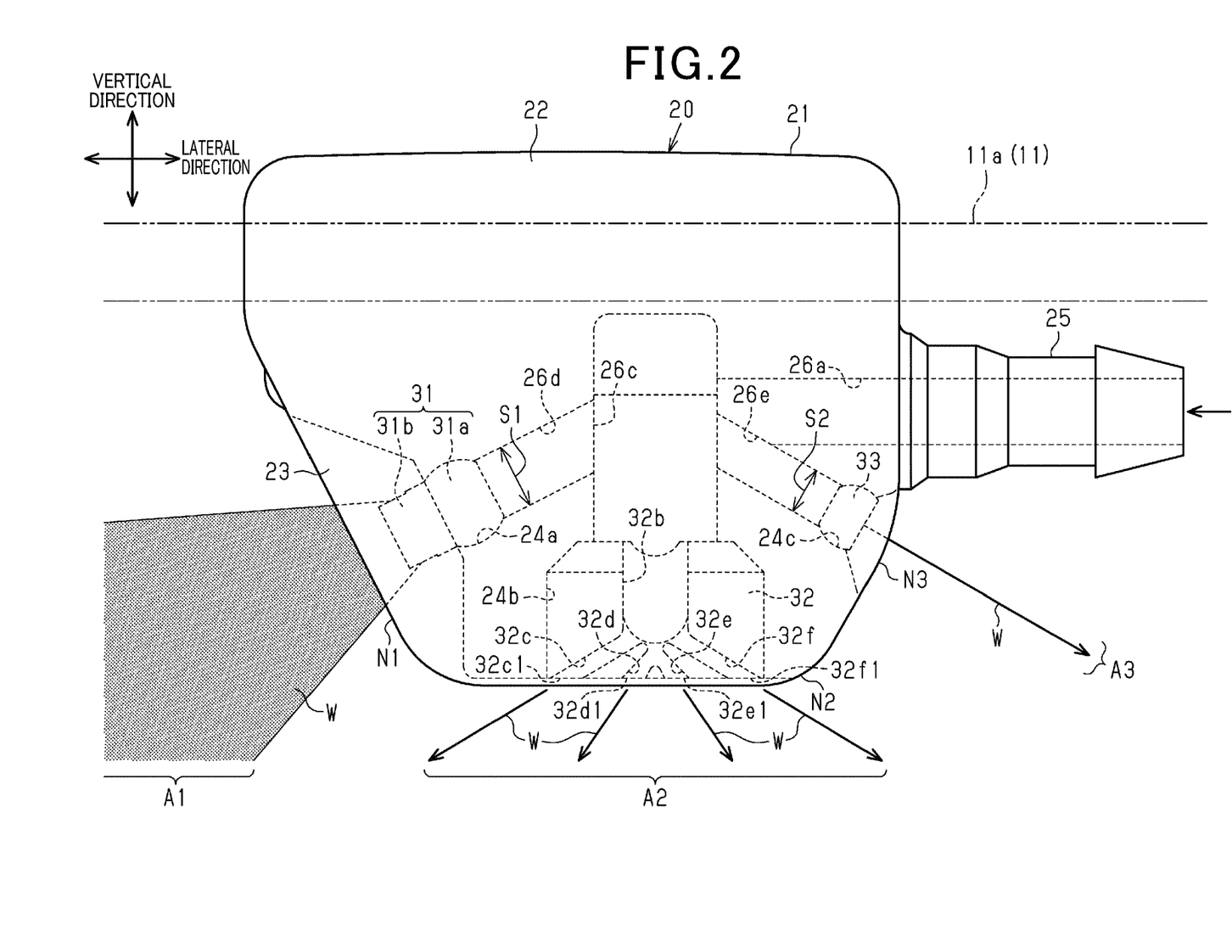
FIG. 2 is a front view of the washer nozzle according to the embodiment.
Figure 3:
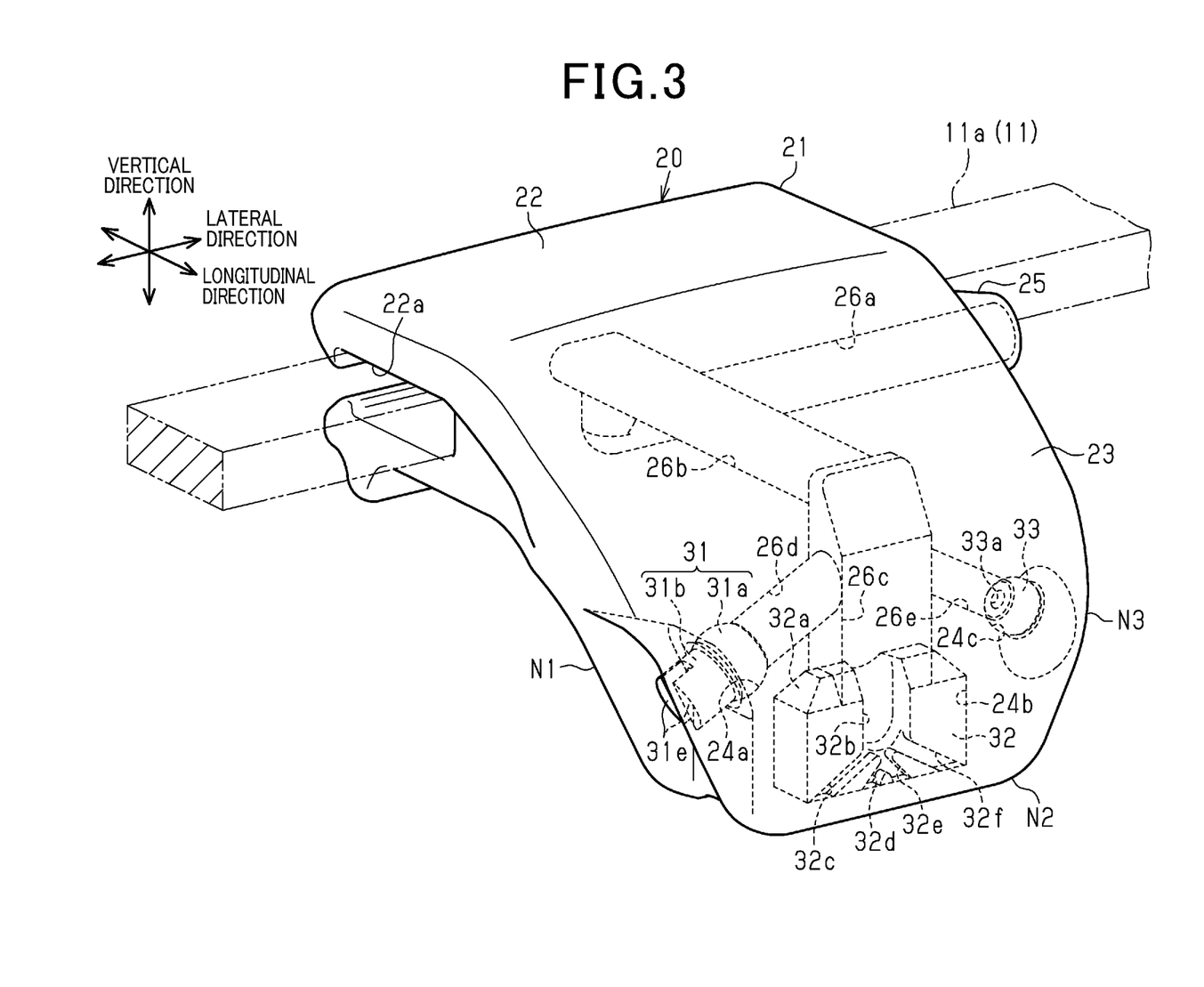
FIG. 3 is a perspective view of the washer nozzle according to the embodiment in an assembled state.
Figure 4:
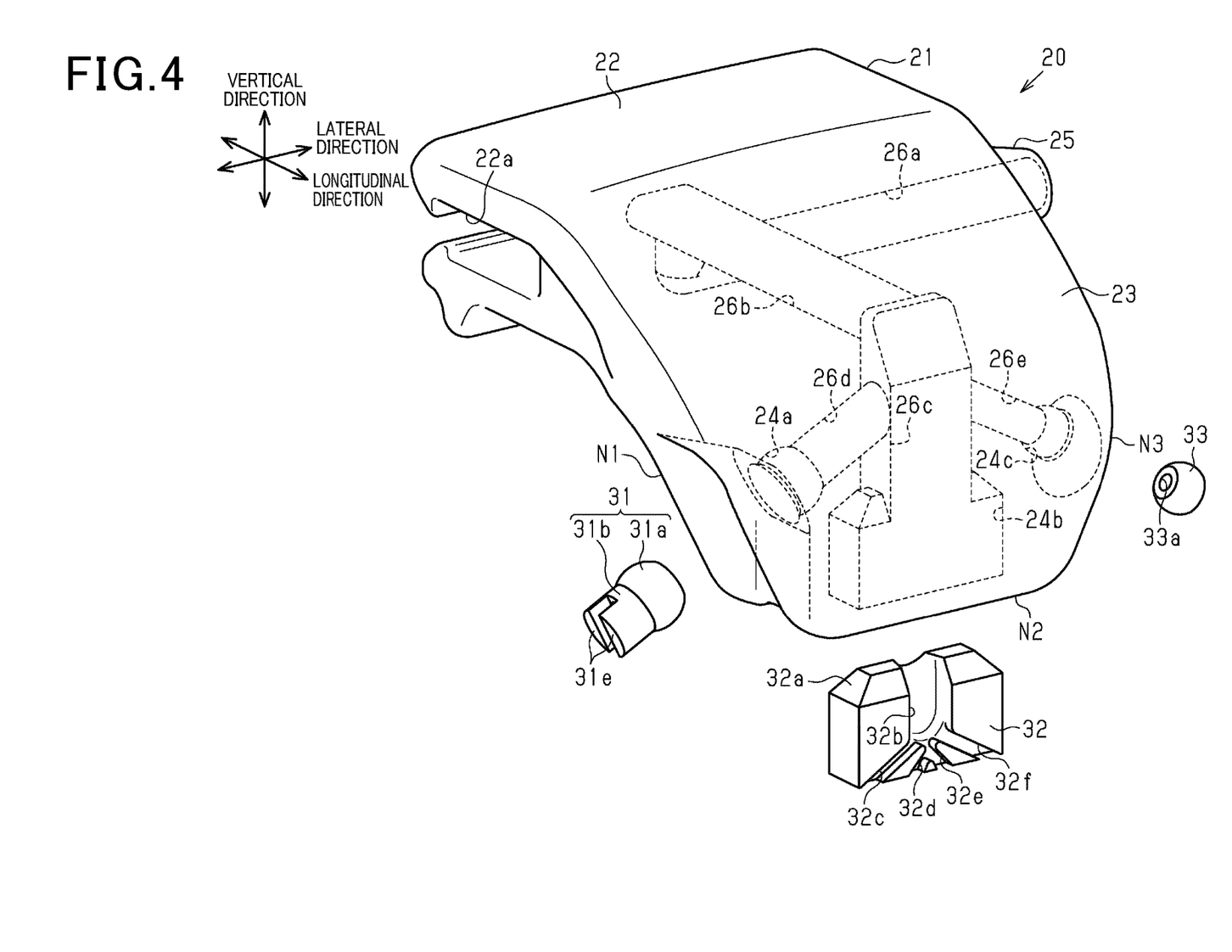
FIG. 4 is a perspective view of the washer nozzle according to the embodiment in an exploded state.
Figure 5:
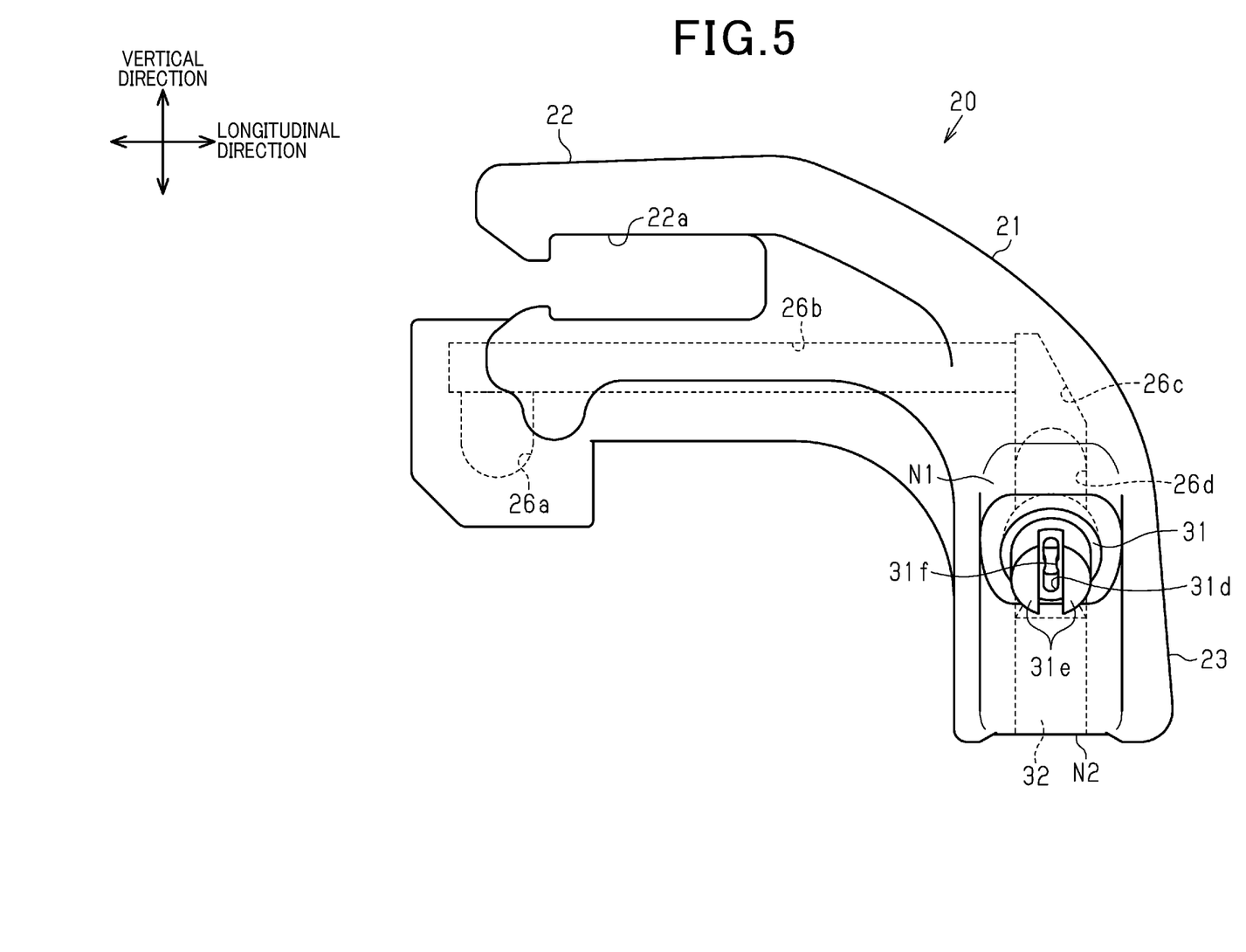
FIG. 5 is a left-side view of the washer nozzle according to the embodiment.

As shown in FIG. 2 to FIG. 4 and the like, the washer nozzle 20 includes a nozzle main body 21 and first to third nozzle components 31 to 33.

The nozzle main body 21 has a mounting portion 22 on a back side of an upper portion thereof. The mounting portion 22 is provided to mount the washer nozzle 20 in the tip-end plate portion 11a of the wiper arm 11. The mounting portion 22 has a mounting recessing portion 22a that is open towards the back side. The tip-end plate portion 11a of the wiper arm 11 is inserted into the mounting recessing portion 22a from one side in a lateral direction that is orthogonal to the longitudinal direction of the wiper arm 11. The mounting portion 22 is mounted to the tip-end plate portion 11a by the tip-end plate portion 11a being inserted into the mounting recessing portion 22a. As a result, the washer nozzle 20 is held to the tip-end plate portion 11a of the wiper arm 11. Here, the washer nozzle 20 can be attached and detached to and from the tip-end plate portion 11a of the wiper arm 11. In addition, the tip-end plate portion 11a of the wiper arm 11 and the mounting recessing portion 22a are engaged in the longitudinal direction. As a result, the washer nozzle 20 is mounted in a state in which movement in the longitudinal direction relative to the wiper arm 11 is restricted.

A downward extending portion 23 that extends downward is provided on a front side in the longitudinal direction that is a side opposite the mounting portion 22 of the nozzle main body 21. The first to third nozzle components 31 to 33 are integrally incorporated into a lower portion of the downward extending portion 23 of the nozzle main body 21. The first to third nozzle components 31 to 33 are arranged in an array in the lateral direction in the lower portion of the downward extending portion 23 of the nozzle main body 21. In the state in which the washer nozzle 20 is mounted in the wiper arm 11, the first to third nozzle components 31 to 33 are arranged in an array in the longitudinal direction of the wiper blade 12. In addition, in this mounted state of the washer nozzle 20, the first to third nozzle components 31 to 33 that are positioned on the front side of the nozzle main body 21 are arranged so as to be displaced towards one side (a front side of the wiper blade 12 shown in FIG. 1) in the transverse direction of the wiper blade 12. That is, the first to third nozzle component 31 to 33 are positioned on a front side of a forward swing in a process of reciprocal wiping of the wiper blade 12.

Furthermore, the first to third nozzle components 31 to 33 respectively configure first to third spraying portions N1 to N3 of the washer nozzle 20. The first spraying portion N1 emits a spray that is oriented downward at an angle that is further towards the tip end side than the approximately center portion in the longitudinal direction of the wiper blade 12 in which the washer nozzle 20 is positioned. The second spraying portion N2 emits a spray that is oriented downward at approximately the center in the longitudinal direction of the wiper blade 12. The third spraying portion N3 emits a spray that is oriented downward at an angle that is further towards the rear end side than the approximately center portion in the longitudinal direction of the wiper blade 12 is. The first to third spraying portions N1 to N3 supply the washer fluid W by spraying onto the wiped surface WSa on one side in the transverse direction of the wiper blade 12. When the washer fluid W is sprayed towards the forward-swing side of the reciprocal wiping of the wiper blade 12, the washer fluid W is supplied in advance towards a front side of an advancing direction of the wiper blade 12, that is, the wiped surface WSa immediately before wiping by the wiper blade 12.

[First Spraying Portion N1]

The first spraying portion N1 is configured using the first nozzle component 31 shown in FIG. 4, FIG. 5, FIG. 7 to FIG. 9, and the like. The first nozzle component 31 is assembled on one side in the lateral direction in the lower portion of the downward extending portion 23 of the nozzle main body 21. That is, in the state in which the washer nozzle 20 is mounted in the wiper arm 11, the first nozzle component 31 is assembled to a portion that corresponds to the tip end portion 12a side of the wiper blade 12.

In the first nozzle component 31, a substantially spherical holding portion 31a and a nozzle portion 31b that sprays the washer fluid W are integrally provided. The holding portion 31a is mounted in a fluid-tight state in a holding recessing portion 24a that is provided in the downward extending portion 23 of the nozzle main body 21. The holding portion 31a is mounted in the holding recessing portion 24a. As a result, the first nozzle component 31 is held to the nozzle main body 21 in a rollable manner. In addition, the holding portion 31a has a holding configuration that allows three-dimensional movement (rolling) relative to the nozzle main body 21 due to the shape of the holding portion 31a itself. That is, in the first nozzle component 31, an orientation of the nozzle portion 31b can be changed. That is, a spray direction of the washer fluid W can be changed. Furthermore, in the holding portion 31a, an introduction flow path 31c for introducing the washer fluid W from the nozzle main body 21 side is provided (see FIG. 9).

The nozzle portion 31b has a spray opening 31d in a center portion and a pair of guide wall portions 31e. The spray opening 31d is formed into a substantially elliptical shape that is elongated in one direction. In addition, a throttle portion 31f is provided in a center portion in the longitudinal direction of the spray opening 31d. The spray opening 31d communicates with the introduction flow path 31c of the holding portion 31a. The pair of guide wall portions 31e are erected on both sides in the transverse direction of the spray opening 31d. The guide wall portions 31e regulate spreading towards the longitudinal direction of the washer nozzle 21 (the lateral direction of the wiper blade 12) of the washer fluid W that is sprayed from the spray opening 31d. That is, in the state in which the washer nozzle 20 is mounted in the washer arm 11, the guide wall portions 31 regulate spreading towards the transverse direction of the wiper blade 12 of the washer fluid W that is sprayed from the spray opening 31d.

As shown in FIG. 1 and FIG. 2, a spray of the washer fluid W in a first spray mode A1 that is oriented downward at an angle towards the tip end side of the wiper blade 12 is emitted from the spray opening 31d of the first nozzle component 31. The first spray mode A1 is a spray mode that has a film-like spread in the longitudinal direction of the wiper blade 12 (simply referred to as a film-like spray). The first spray mode A1 assumes continuous landing of the washer fluid W onto the wiped surface WSa in an area, to the approximately center portion, from a point that is approximately one-fourth a length of the wiper blade 12 in the longitudinal direction from the tip end portion 12a. In addition, of the spray in the first spray mode A1, a center portion in the longitudinal direction is set to have a slightly stronger spray momentum than other portions. In other words, the first spray mode A1 forms a shape that spreads in a film-like manner in reflection of the elliptical shape of the spray opening 31d. In addition, the spray momentum at the center portion in the spraying mode A1 is strong in reflection of the throttle portion 31f of the spray opening 31d.

[Second Spraying Portion N2]

Figure 7:
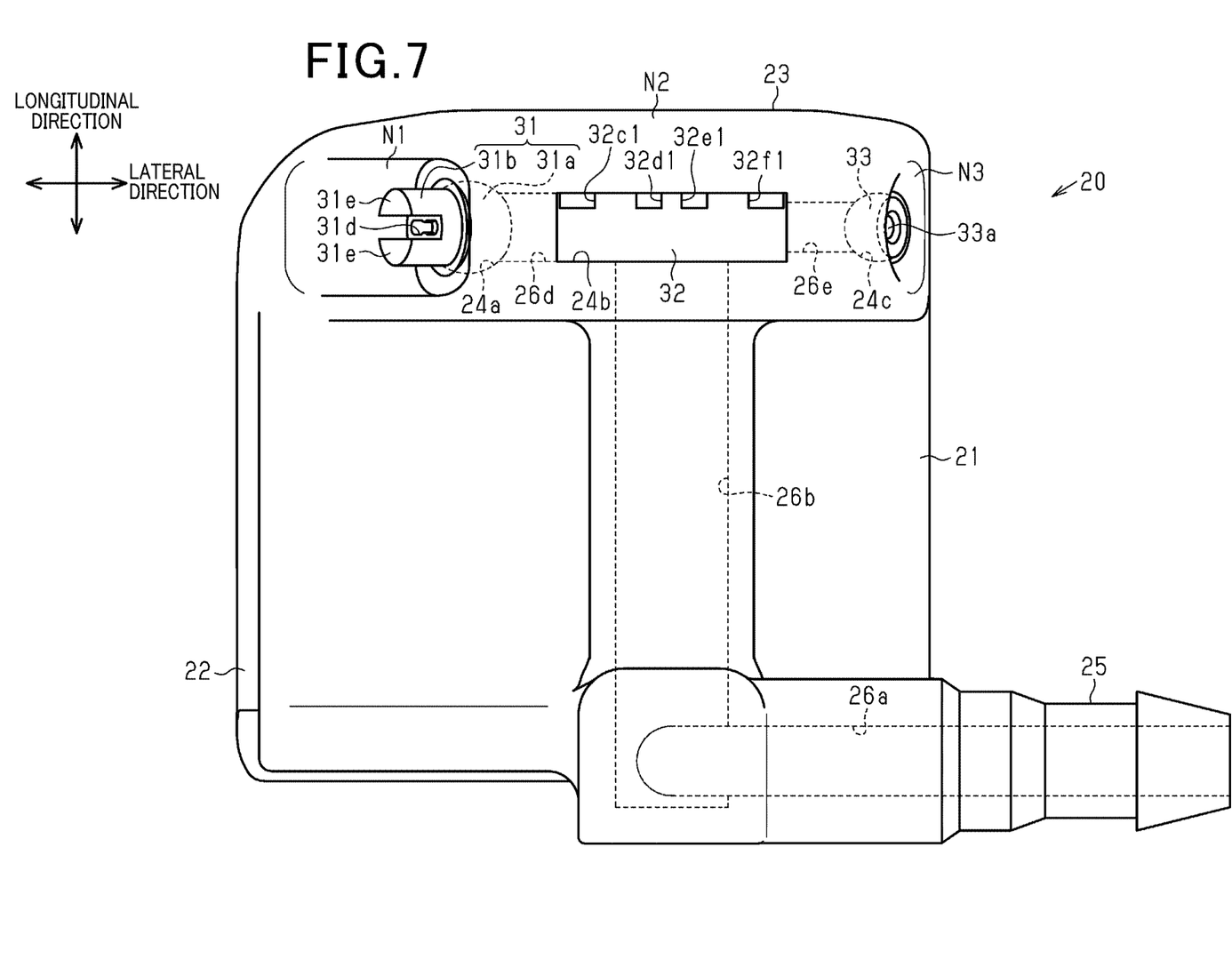
FIG. 7 is a bottom view of the washer nozzle according to the embodiment.
Figure 8:
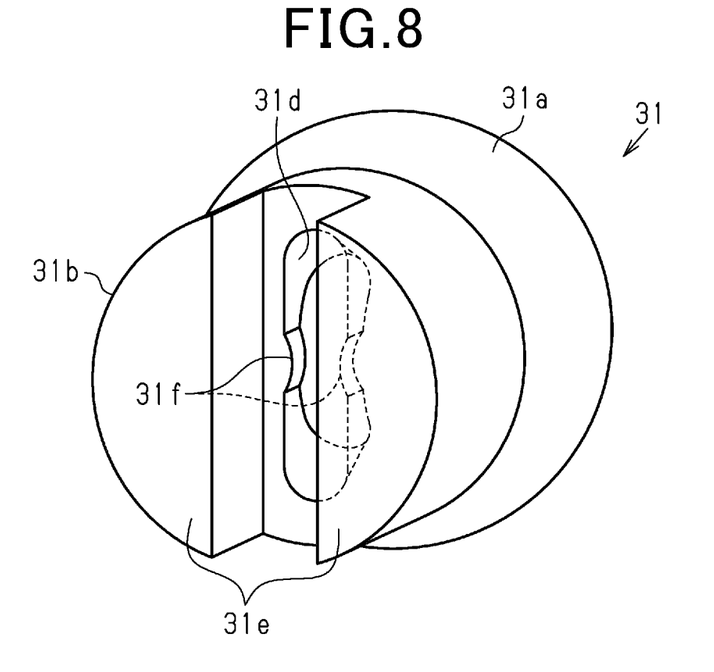
FIG. 8 is a perspective view of a nozzle component of the washer nozzle according to the embodiment.
Figure 9:
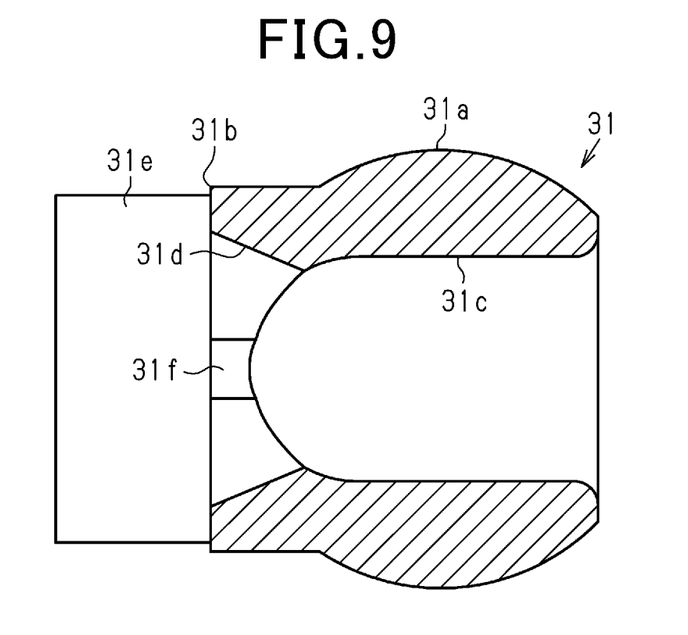
FIG. 9 is a cross-sectional view of the nozzle component of the washer nozzle according to the embodiment.

The second spraying portion N2 is configured using the second nozzle component 32 shown in FIG. 4, FIG. 7, and the like. The second nozzle component 32 is assembled to the center portion in the lateral direction in the lower portion of the downward extending portion 23 of the nozzle main body 21. That is, in the state in which the washer nozzle 20 is mounted in the wiper arm 11, the second nozzle component 32 is assembled to a portion that corresponds to the approximately center portion in the longitudinal direction of the wiper blade 12 in a state in which spray openings 32c1 to 32f1, described hereafter, oppose the wiped surface WSa.

The second nozzle component 32 is configured to have a substantially rectangular parallelepiped shape. The second nozzle component 32 is held so as to be mounted in a fluid-tight state in a holding recessing portion 24b that is provided in the downward extending portion 23 of the nozzle main body 21. An upper portion of the second nozzle component 32 is an inserting portion 32a that has a tapered shape. Insertion of the second nozzle component 32 into the holding recessing portion 24b is thereby facilitated.

On a surface on a front side of the second nozzle component 32, an introduction flow path 32b for introducing the washer fluid W from the nozzle main body 21 side and spray flow paths 32c to 32f that branch out into four flow paths from the introduction flow path 32b are provided. The spray flow paths 32c to 32f each have a smaller flow path cross-sectional area than the introduction flow path 32b. The introduction flow path 32b and the spray flow paths 32c to 32f are formed into linear groove shapes that are surrounded by wall surfaces on three sides and open on one side (the overall front side). That is, the second nozzle component 32 is assembled to the holding recessing portion 24b of the nozzle main body 21, and thus the open portion of the groove shape is sealed by an inner wall surface of the holding recessing portion 24b. Flow paths in which respective four peripheral sides of the introduction flow path 32b and the spray flow paths 32c to 32f are closed are thereby completed. In other words, because the introduction flow path 32b and the spray flow paths 32c to 32f are formed into groove shapes, fabrication of the flow paths 32b to 32f in the second nozzle component 32 is facilitated. More specifically, the plurality of flow paths 32b to 32f and the spray openings 32c1 to 32f1 can be easily simultaneously fabricated in the second nozzle component 32 without use of a slide mold or the like. When the second nozzle component 32 is assembled to the holding recessing portion 24b of the nozzle main body 21, the four spray openings 32c1 to 32f1 that are opening portions of the four spray flow paths 32c to 32f are configured in a lower portion of the washer nozzle 20 (see FIG. 7). The spray openings 32c1 to 32f1 are each formed into a rectangular shape.

In addition, as shown in FIG. 1 and FIG. 2, a spray of the washer fluid W in a second spray mode A2 that is oriented downward at the center of the wiper blade 12 is emitted from each of the spray openings 32c1 to 32f1 of the second nozzle component 32. The second spray mode A2 is configured by two spray modes that are oriented downward at angles that are slightly towards the tip end side and two spray modes that are oriented downward at angles that are slightly towards the rear end side. In other words, the spray flow paths 32c to 32f that determine the second spray mode A2 have tilted configurations in which the sprays are emitted at respective orientations. The second spray mode A2 is a spray mode in which the four spray modes each have linear directionality (simply referred to as a linear spray). The second spray mode A2 is set such that landing positions of the washer fluid W from the spray openings 32c1 to 32f1 are arrayed in the longitudinal direction so as to follow the landing position in the first spray mode A1 in the longitudinal direction of the wiper blade 12, and the washer fluid W is supplied to the wiped surface WSa near the approximately center portion of the wiper blade 12.

In particular, in the two spray modes that are oriented downward at angles that are slightly towards the rear end side of the wiper blade 12, the sprays are emitted from the spray openings 32e1 and 32f1 of the flow paths 32e and 32f of the second nozzle component 32. Respective directions in the two spray modes are set such that the orientation of the spray from the spray opening 32f1 is further towards the rear end side than the orientation of the spray from the spray opening 32e1 is.

[Third Spraying Portion N3]

Figure 6:
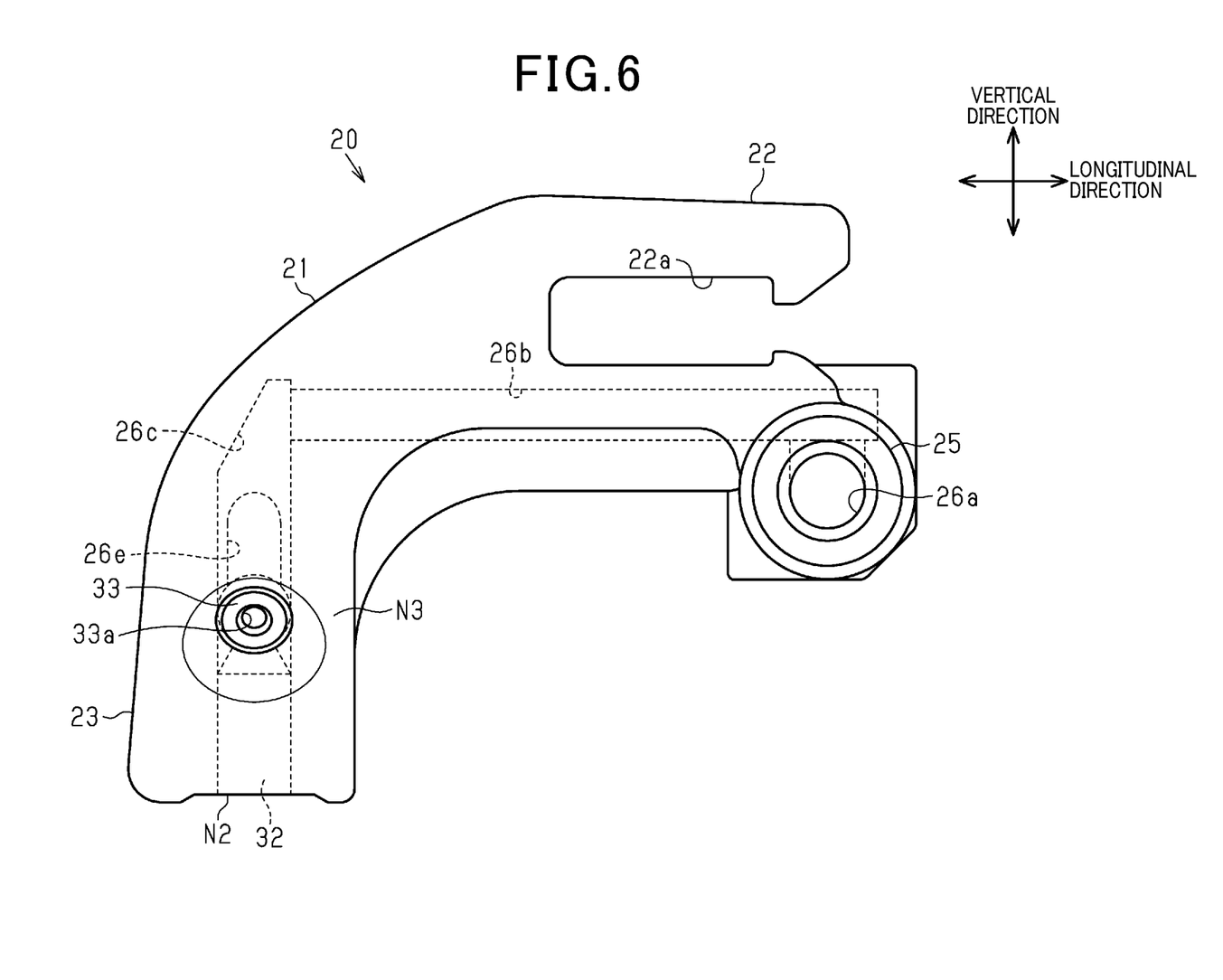
FIG. 6 is a right-side view of the washer nozzle according to the embodiment.

The third spraying portion N2 is configured using the third nozzle component 33 shown in FIG. 4, FIG. 6, FIG. 7, and the like. The third nozzle component 33 is assembled on the other side in the lateral direction in the lower portion of the downward extending portion 23 of the nozzle main body 21. That is, in the state in which the washer nozzle 20 is mounted in the wiper arm 11, the third nozzle component 33 is assembled in a rollable manner to a portion that corresponds to the rear end portion 12b side of the wiper blade 12.

The third nozzle component 33 is configured to have a substantially spherical shape. The third nozzle component 33 is mounted in a fluid-tight state in a holding recessing portion 24c that is provided in the downward extending portion 23 of the nozzle main body 21. The third nozzle component 33 has a holding configuration that allows three-dimensional movement (rolling) relative to the nozzle main body 21 due to the shape of the third nozzle component 33 itself. That is, the orientation of the third nozzle component 33 can be changed. That is, the spray direction of the washer fluid W can be changed. The third nozzle component 33 has a spray opening 33a in a center portion (see FIG. 6). The spray opening 33a has a circular shape.

In addition, as shown in FIG. 1 and FIG. 2, a spray of the washer fluid W in a third spray mode A3 that is oriented downward at an angle towards the rear end side of the wiper blade 12 is emitted from the spray opening 33a of the third nozzle component 33. The third spray mode A3 is a spray mode that has linear directionality (simply referred to as a linear spray). The third spray mode A3 is set such that a landing position of the washer fluid W from the spray opening 33a is arrayed in the longitudinal direction so as to follow the landing positions of the second spray mode A2 in the longitudinal direction of the wiper blade 12, and the washer fluid W is supplied to the wiped surface WSa that lies in a position of approximately one-fourth a length of the wiper blade 12 in the longitudinal direction from the rear end portion 12b. As indicated by broken-line arrows Wx in FIG. 1, the orientation of the spray of the spray opening 32f1 in the above-described second spray mode A2 is set closer to the rear end side. Thus, the landing of the washer fluid W can be set based on an assumption that the washer fluid W lands further towards the rear end side in the longitudinal direction of the wiper blade 12 in the third spray mode A3. Consequently, for example, the supply of the washer fluid W in the third spray mode A3 that is oriented towards the rear end portion 12b of the wiper blade 12 during high-speed travel of the vehicle can be effectively performed.

[Supply of the Washer Fluid W to the First to Third Spraying Portions N1 to N3]

As shown in FIG. 2 to FIG. 4 and the like, an introduction cylinder portion 25 that protrudes towards the rear end portion 12b of the wiper blade 12 is provided on a lower side of the mounting portion 22 of the nozzle main body 21. The introduction cylinder portion 25 protrudes towards the base-end-portion side of the wiper arm 11. The introduction cylinder portion 25 is connected to a feeding hose (not shown) that is routed along the wiper arm 11 and is provided to receive the washer fluid W that is fed from the vehicle-body side. An introduction flow path 26a on an inner side of the introduction cylinder portion 25 of the nozzle main body 21 extends to a center portion in the lateral direction inside the nozzle main body 21 and, at the end, communicates with a center flow path 26b that extends in a substantially orthogonal direction on a front side. The center flow path 26b communicates with a downward flow path 26c that extends downward within the downward extending portion 23 on the front side of the nozzle main body 21.

The downward flow path 26c communicates with the introduction flow path 32b of the second nozzle component 32 that is held in the holding recessing portion 24b. From one side in the lateral direction of the downward flow path 26c, a branching flow path 26d extends downward at an angle towards the holding recessing portion 24a that holds the first nozzle component 31. A lower end portion of the branching flow path 26d communicates with the introduction flow path 31c (see FIG. 9) of the first nozzle component 31 that is held in the holding recessing portion 24a. In addition, from the other side in the lateral direction of the downward flow path 26c, a branching flow path 26e extends downward at an angle towards the holding recessing portion 24c that holds the third nozzle component 33. A lower end portion of the branching flow path 26e communicates with the spray opening 33a of the third nozzle component 33 that is held in the holding recessing portion 24c.

Then, the washer fluid W that is fed into the introduction cylinder portion 25 flows through the introduction flow path 26a, the center flow path 26b, the downward flow path 26c. The washer fluid W then branches out in three directions that are the downward flow path 26c itself and the two branching flow paths 26d and 26e. The washer fluid W that advances from the branching flow path 26d to the introduction flow path 31c of the first nozzle component 31 becomes the film-like spray that is the first spray mode A1 from the spray opening 31d. The film-like spray is emitted onto the wiped surface WSa near the tip end portion 12a of the wiper blade 12 (see FIG. 1).

In addition, the washer fluid W that advances from the downward flow path 26c to the introduction flow path 32b of the second nozzle component 32 becomes the four linear sprays that are the second spray mode A2 from the spray openings 32c1 to 32f1, through the four spray flow paths 32c to 32f. Each linear spray is emitted onto the wiped surface WSa near the center portion of the wiper blade 12 (see FIG. 1). Furthermore, the washer fluid W that advances from the branching flow path 26e to the third nozzle component 33 becomes the single linear spray that is the third spray mode A3 from the spray opening 33a. The single linear spray is emitted onto the wiped surface WSa near the rear end portion 12b of the wiper blade 12 (see FIG. 1).

Regarding the sprays described above, a flow-path cross-sectional area S1 of the branching flow path 26d that sends the washer fluid W for the film-like spray in the first spray mode A1 is greater than a flow-path cross-sectional area S2 of the branching flow path 26e that sends the washer fluid W for the linear spray in the third spray mode A3. The film-like spray in the first spray mode A1 requires a greater flow amount per unit time of the washer fluid W than the linear spray in the third spray mode A3. Therefore, the flow-path cross-sectional areas S1 and S2 are set to enable a favorable film-like spray to be emitted.

[Workings According to the Present Embodiment]

Workings according to the present embodiment will be described.

The vehicle windshield wiper 10 according to the present embodiment supplies the washer fluid W by spraying onto the wiped surface WSa in the first to third spray modes A1 to A3, from the first to third spraying portions N1 to N3 of the washer nozzle 20, based on the washer fluid W being fed from the vehicle-body side. The sprays of the washer fluid W from the first to third spraying portions N1 to N3 are emitted on one side in the transverse direction of the wiper blade 12. The film-like spray in the first spray mode A1 is emitted downward at an angle towards the tip end side of the wiper blade 12. The four linear sprays in the second spray mode A2 are emitted downward at the center. The single linear spray in the third spray mode A3 is emitted downward at an angle towards the rear end side.

Here, during the process of the wiping operation of the vehicle windshield wiper 10, the wiper blade 12 changes attitude from that in which the longitudinal direction of the wiper blade 12 runs along the lateral direction of the vehicle to that in which the longitudinal direction runs along the longitudinal direction of the vehicle. When the longitudinal direction of the wiper blade 12 runs along the longitudinal direction of the vehicle, as shown in FIG. 1, vehicle travel wind X such as that which moves from the rear end portion 12b of the wiper blade 12 to the tip end portion 12a acts on the periphery of the wiper blade 12.

In a state such as this, if a linear spray is used in the first spray mode A1, the propulsion force of the washer fluid W by this linear spray is strong and the wiper fluid W lands in a localized manner. In addition, because an angle of incidence of the washer fluid W relative to the wiped surface WSa is small, the washer fluid W after landing on the wiped surface WSa widely spreads towards the tip end side in the spray direction due to the propulsion force. The washer fluid W tends to be supplied beyond the tip end portion 12a of the wiper blade 12. Furthermore, the spreading of the washer fluid W is further facilitated due to effects of the vehicle travel wind X, as well, during high-speed travel, and the area in which the washer fluid W is supplied is unstable. The washer fluid W is supplied beyond the longitudinal direction range of the wiper blade 12.

In contrast, according to the present embodiment in which the film-like spray that has a film-like spread is used in the first spray mode A1 that sprays towards the tip end side of the wiper blade 12, the washer fluid W that is sprayed so as to spread in a film like manner from the first spraying portion N1 has a weaker propulsion force than the linear spray. Therefore, the washer fluid W of the film-like spray after landing on the wiped surface WSa has a smaller spread in the spraying direction resulting from the propulsion force, compared to that of the linear spray. The washer fluid W can be suppressed from being supplied beyond the tip end portion 12a of the wiper blade 12 on the tip end side in the longitudinal direction of the film-like spray.

In addition, unlike when the washer fluid W is supplied within the longitudinal direction range of the wiper blade 12, or specifically, in the longitudinal direction with the expectation of the washer fluid W spreading upon landing, the film-like spray can enable the washer fluid W to land on the wiped surface WSa continuously in an area from near the center in the longitudinal direction to the tip end side. A supply of washer fluid W that is substantially uniform in the longitudinal direction can be achieved. That is, because, unlike the linear spray, a large amount of washer fluid W is not supplied in a localized manner on the tip end side, an amount of washer fluid W that is spread in the longitudinal direction of the wiper blade 12 is small even when tailwind from the vehicle travel wind X is received.

Consequently, the area in which the washer fluid W is supplied is stabilized and the washer fluid W is suppressed from being supplied beyond the longitudinal direction range of the wiper blade 12. Therefore, the washer fluid W can be favorably supplied without waste. Here, the film-like spray can be considered to be a continuous spray of which the angle of incidence relative to the wiped surface WSa gradually increases from the tip end side in the longitudinal direction of the wiper blade 12 towards the center portion. The washer fluid W can be further suppressed from spreading after landing due to the propulsion force near the center in the longitudinal direction.

Here, in a vehicle that is designed for cold weather, the wiper blade 12 is replaced with a wiper blade that is taller compared to standard specifications. In this case, a height of the washer nozzle 20 from the wiped surface WSa (that is, a height of each spray opening) is higher than that in the standard specifications. As a result, the washer fluid W being supplied beyond the tip end portion 12a of the wiper blade 12, that is, a so-called spray out easily occurs. However, because the film-like spray has a weak propulsion force, changes in the landing position of the washer fluid W relative to the changes in the height of the washer nozzle 20 can be suppressed. The washer fluid W can be more easily supplied to remain within the tip end portion 12a of the wiper blade 12.

In addition, the spray of the washer fluid W that is oriented downward at an angle towards the rear end side of the wiper blade 12 is a spray in a headwind that is oriented in a direction opposite the vehicle travel wind X. Therefore, the spray is easily pushed back by the vehicle travel wind X. Taking this into consideration, according to the present embodiment, the linear spray that has directionality and in which the propulsion force of the washer fluid W is strong is used in the third spray mode A3. As a result, an influence caused by the vehicle travel wind X that becomes the headwind can be suppressed. Consequently, the landing position of the washer fluid W on the wiped surface WSa by the linear spray is not significantly shifted from an expected landing position, and the washer fluid W can be favorably supplied.

Here, because the washer nozzle 20 according to the present embodiment is such that the orientation of the first nozzle component 31 that generates the film-like spray can be three-dimensionally changed, the spray direction can be adjusted to a desired direction. In addition, in a similar manner, regarding the third nozzle component 33 that generates the linear spray, the spray direction can be adjusted by the orientation of the third nozzle component 33 being changed. Consequently, individual differences, changes in specifications, and the like of the wiper blade 12 can be easily addressed.

Furthermore, the second spraying portion N2 of the washer nozzle 20 according to the present embodiment is configured such that the second nozzle component 32 is mounted in the holding recessing portion 24b that is provided in the downward extending portion 23 of the nozzle main body 21. Therefore, the second nozzle components 32 that have the spray flow paths 32c to 32f and the spray openings 32c1 to 32f1 that differ in quantity and orientation are mounted in the holding recessing portion 24b. Thus, the second spray nozzle portions N2 of differing settings can be easily configured while sharing the same nozzle main body 21.

[Effects According to the Present Embodiment]

Effects according to the present embodiment will be described.

(1) The washer nozzle 20 that is included in the vehicle windshield wiper 10 according to the present embodiment includes the first spraying portion N1 that serves as a film-like spraying portion for the spray of the washer fluid W that is oriented downward at an angle towards the tip end side of the wiper blade 12. From the first spraying portion N1, the spray of the washer fluid W that has a film-like spread in the longitudinal direction of the wiper blade 12 is emitted. The washer fluid W that is sprayed so as to spread in a film-like manner from the first spraying portion N1 can be made to continuously land on the wiped surface WSa within the longitudinal direction range of the wiper blade 12. For example, compared to intermittent landing such as that when sprays that have linear directionality are emitted at multiple points (from a plurality of spray openings), the washer fluid W that is substantially uniformly continuous in the longitudinal direction can be supplied.

In addition, the washer fluid W that is sprayed so as to spread in a film-like manner from the first spraying portion N1 has a weaker propulsion force compared to the spray that has linear directionality. Therefore, the washer fluid W after landing on the wiped surface W also has a smaller spread in the spray direction resulting from the propulsion force. Therefore, even when the tip end side of the film-like spray is sprayed near the tip end portion 12a of the wiper blade 12, the washer fluid W can be suppressed from spreading due to the propulsion force after landing. In this manner, according to the present embodiment, the sprayed washer fluid W can be favorably supplied to the wiped surface WSa within the longitudinal direction range of the wiper blade 12, without waste.

(2) The washer nozzle 20 according to the present embodiment further includes the third spraying portion N3 as a linear spraying portion for the spray of the washer fluid W that is oriented downward at an angle towards the rear end side of the wiper blade 12. From the third spraying portion N3, the spray of the washer fluid W that has linear directionality, unlike the spray that has the film-like spread of the first spray portion N1, is emitted. The washer fluid W that is linearly sprayed from the third spraying portion N3 has a strong propulsion force. Even when the washer fluid W is sprayed towards the rear end side that is a headwind state in which the washer fluid W is easily pushed back by the vehicle travel wind X, an influence caused by the vehicle travel wind X can be suppressed. Consequently, the landing of the washer fluid W onto the wiped surface WSa by this spray is not significantly shifted from the expected landing, and the washer fluid W can be favorably supplied.

(3) The washer nozzle 20 includes the branching flow paths 26d and 26e that branch out to the first and third spraying portions N1 and N3 from the downward flow path 26c, as internal flow paths through which the washer fluid W flows. The flow-path cross-sectional area S1 of the branching flow path 26d that branches out towards the first spraying portion N1 is set to be greater than the flow-path cross-sectional area S2 of the branching flow path 26e that branches out towards the third spraying portion N3. That is, the film-like spray of the first spraying portion N1 requires a greater flow amount (fluid amount) per unit time of the washer fluid W than the linear spray of the third spraying portion N3. Consequently, the flow-path cross-sectional areas S1 and S2 are set as described above. Thus, a favorable film-like spray can be emitted.

(4) In the first spraying portion N1 that performs the film-like spray, the spray opening 31d has an opening shape that is elongated in one direction. In addition, the throttle portion 31f is provided in the center portion in the longitudinal direction of the spray opening 31*d*. The shape of the throttle portion 31*f* is changed. As a result, a film-like spray in which the spray momentum of the washer fluid W is adjusted between both end portions and the center portion can be emitted.

(5) In the first spraying portion N1 that emits the film-like spray, the pair of guide wall portions 31*e* are provided in a protruding manner on both sides in the transverse direction of the spray opening 31*d* that has an opening shape that is elongated in one direction. As a result, the film-like spray of which the spread of the washer fluid W in the transverse direction is regulated can be emitted.

(6) The washer nozzle 20 is configured such that the nozzle main body 21 and the first to third nozzle components 31 to 33 are fabricated as separate components, and the nozzle components 31 to 33 are integrally incorporated into the nozzle main body 21. The nozzle main body 21 and the first to third nozzle components 31 to 33 are separate components. Thus, the nozzle main body 21 and the first to third nozzle components 31 to 33 can be easily fabricated. In addition, the first and third nozzle components 31 and 33 are incorporated to be held in such a manner as to allow rolling relative to the nozzle main body 21, and thus the spray directions of the washer fluid W can be adjusted.

(7) The flow paths 32*b* to 32*f* of the washer fluid W that are fabricated in the second nozzle component 32 are each formed into a groove shape. Then, the second nozzle component 32 is incorporated into the nozzle main body 21, and thus the open portions of the groove shapes are sealed and configured as the flow paths 32*b* to 32*f* of which the peripheries are closed. Consequently, the flow paths 32*b* to 32*f* and the spray openings 32*c*1 to 32*f*1 are grooves rather than holes, and thus a mold structure for resin molding can be easily fabricated without use of an additional mold, such as a slide mold.

[Modifications]

The present embodiment can be modified in the following manner. The present embodiment and modifications below can be combined as long as technical contradictions do not occur.

The film-like spray is set as the spray that is oriented downward at an angle towards the tip end side of the wiper blade 12. The four linear sprays are set as the spray that is oriented downward at the center. The single linear spray is set as the spray that is oriented downward at an angle towards the rear end side. However, this combination of spray modes is merely an example and may be modified as appropriate. In addition, the number of linear sprays may also be modified as appropriate.

The washer nozzle 20 is configured such that the first to third nozzle components 31 to 33 are incorporated into the nozzle main body 21 and the first to third nozzle portions N1 to N3 are configured. However, this configuration is merely an example. A number of spray portions, a number of components, and the like may be modified as appropriate.

The washer nozzle 20 is mounted in the wiper arm 11. However, the washer nozzle 20 may be mounted in the wiper blade 12. The washer nozzle 20 is mounted in a detachable manner. However, the washer nozzle 20 may be integrally provided in the vehicle windshield wiper 10.

The configuration of the wiper blade 12 that is described in particular detail in the configuration of the vehicle windshield wiper 10 is merely an example and may be modified as appropriate. For example, the wiper blade 12 may be changed to a wiper blade that is configured using a lever assembly that has a tournament structure, a wiper blade that is configured by a single lever, or a lever-less wiper blade.

What is claimed is:

1. A vehicle windshield wiper comprising:
   a wiper blade that wipes a wiped surface;
   a wiper arm that is connected to the wiper blade and transmits driving force for a wiping operation to the wiper blade; and
   a washer nozzle that supplies a washer fluid to the wiped surface by spraying and is integrally provided in the wiper arm or the wiper blade, wherein
   the washer nozzle includes
      a layer spraying portion that emits a spray that has a layer extending in the longitudinal direction of the wiper blade, and
      a linear spraying portion that emits a spray that has linear directionality,
   wherein the layer spraying portion and the linear spraying portion having different spray modes with respect to each other,
   when an end portion in a longitudinal direction of the vehicle windshield wiper on a side that coincides with a tip end portion of the vehicle windshield wiper is a tip end portion of the wiper blade and an end portion on an opposite side is a rear end portion of the wiper blade,
   the linear spraying portion emits a spray of the washer fluid that is oriented downward at an angle towards a rear end side of the wiper blade,
   the layer spraying portion emits a spray of the washer fluid that is oriented downward at an angle towards at least a tip end side of the wiper blade, and
   the layer spraying portion has an opening shape in which a spray opening for the washer fluid is elongated in one direction.

2. The vehicle windshield wiper according claim 1, wherein:
   the washer nozzle further includes
      branching flow paths that respectively branch out to the layer spraying portion and the linear spraying portion from an internal flow path through which the washer fluid flows; and
      a flow-path cross-sectional area of the branching flow path that branches out towards the layer spraying portion is set to be greater than a flow-path cross-sectional area of the branching flow path that branches out towards the linear spraying portion.

3. The vehicle windshield wiper according to claim 2, wherein:
   a throttle portion is provided in a center portion in a longitudinal direction of the spray opening.

4. The vehicle windshield wiper according to claim 3, wherein:
   a pair of guide wall portions is provided on both sides in a transverse direction of the spray opening to regulate spreading of the washer fluid in the transverse direction.

5. The vehicle windshield wiper according to claim 4, wherein:
   the washer nozzle further includes
      a nozzle main body, and
      a nozzle component that has a spray opening for spraying the washer fluid and is incorporated into the nozzle main body; and
   the nozzle component is incorporated into the nozzle main body to be held in such a manner as to allow rolling relative to the nozzle main body so as to enable adjustment of a spraying direction of the washer fluid.

6. The vehicle windshield wiper according to claim 4, wherein:

the washer nozzle further includes
  a nozzle main body, and
  a nozzle component that has a spray opening for spraying the washer fluid and is incorporated into the nozzle main body; and
the nozzle component is configured such that a flow path for the washer fluid is formed into a groove shape, and in a state in which the nozzle component is assembled to the nozzle main body, an open portion of the groove shape is sealed and configured as a flow path of which a periphery is closed.

7. The vehicle windshield wiper according to claim 1, wherein:
  a throttle portion is provided in a center portion in a longitudinal direction of the spray opening.

8. The vehicle windshield wiper according to claim 1, wherein:
  a pair of guide wall portions is provided on both sides in a transverse direction of the spray opening to regulate spreading of the washer fluid in the transverse direction.

9. The vehicle windshield wiper according to claim 1, wherein:
  the washer nozzle further includes
    a nozzle main body, and
    a nozzle component that has a spray opening for spraying the washer fluid and is incorporated into the nozzle main body; and
  the nozzle component is incorporated into the nozzle main body to be held in such a manner as to allow rolling relative to the nozzle main body so as to enable adjustment of a spraying direction of the washer fluid.

10. The vehicle windshield wiper according to claim 1, wherein:
  the washer nozzle further includes
    a nozzle main body, and
    a nozzle component that has a spray opening for spraying the washer fluid and is incorporated into the nozzle main body; and
  the nozzle component is configured such that a flow path for the washer fluid is formed into a groove shape, and in a state in which the nozzle component is assembled to the nozzle main body, an open portion of the groove shape is sealed and configured as a flow path of which a periphery is closed.

* * * * *